United States Patent
Schroeder et al.

(10) Patent No.: US 7,406,091 B2
(45) Date of Patent: Jul. 29, 2008

(54) DISTRIBUTION OF COMMUNICATIONS BETWEEN PATHS

(75) Inventors: Michael A. Schroeder, Dallas, TX (US); Craig W. Warner, Addison, TX (US); Gary Belgrave Gostin, Plano, TX (US); Mark Edward Shaw, Garland, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 835 days.

(21) Appl. No.: 10/756,668

(22) Filed: Jan. 12, 2004

(65) Prior Publication Data

US 2005/0152390 A1 Jul. 14, 2005

(51) Int. Cl.
 *H04L 12/28* (2006.01)
 *H03M 13/00* (2006.01)
 *G06F 15/173* (2006.01)

(52) U.S. Cl. ............... 370/432; 370/389; 370/392; 709/238; 714/756

(58) Field of Classification Search ......... 370/235–389, 370/412–432; 709/213–245; 714/752–756
 See application file for complete search history.

(56) References Cited

U.S. PATENT DOCUMENTS

| 5,386,466 A | * | 1/1995 | Bales et al. ............. 379/221.06 |
| 2003/0118042 A1 | * | 6/2003 | Nishida et al. ............. 370/404 |
| 2004/0008687 A1 | * | 1/2004 | Matsubara ............. 370/395.21 |
| 2004/0076154 A1 | * | 4/2004 | Mizutani et al. ............ 370/389 |

* cited by examiner

*Primary Examiner*—M. Phan

(57) ABSTRACT

Distributing communications between paths, comprises providing a plurality of destinations, providing a plurality of communications paths such that each of the plurality of destinations can be accessed over each of the plurality of communications paths, defining destination addresses interleaved over the plurality of destinations, sending communications from a source to a plurality of the interleaved addresses, and selecting different ones of the plurality of paths for successive communications that are sent to addresses on different destinations, wherein the path for a communication is selected using at least a part of the address of the communication.

23 Claims, 2 Drawing Sheets

DISTRIBUTION OF COMMUNICATIONS BETWEEN PATHS

FIELD OF THE INVENTION

The invention relates to the distribution of communications traffic between two or more paths.

BACKGROUND

In a communications system, there may exist two or more paths by which information can be transferred from a sender to a recipient. It is desirable to be able to select the path by which each message is sent so as to make efficient use of the capacity of the communications paths. Where the overall path by which information travels includes shorter "hops," it is desirable to be able to select the path for an individual hop.

BRIEF SUMMARY

In one embodiment, the invention provides a method of distributing communications between paths, comprising providing a plurality of destinations, providing a plurality of communications paths such that the plurality of destinations can be accessed over the plurality of communications paths, defining destination addresses, sending messages from a source to a plurality of the destination addresses, and selecting different ones of the plurality of paths for successive messages in a series of messages having sequential addresses, wherein the path for a message is selected using part of the address of the message.

In another embodiment, the invention provides a method of distributing communications between paths, comprising assigning a selection number to each of a plurality of destinations, wherein each destination is accessible over a plurality of data paths, sending sequential messages to addresses interleaved over the destinations, combining the selection number with a part of the address more significant than the part used for interleaving, and selecting one of said plurality of common data paths for each message on the basis of the combination.

In a further embodiment, the invention provides a method of distributing communications between paths, comprising defining destination addresses in rows, each row interleaved over a plurality of columns, sending successive messages to a plurality of the destination addresses, wherein each of the plurality of destination addresses is accessible over a plurality of common data paths, within a row of addresses, selecting successive paths for messages to successive columns, and for the first column of each row of addresses, selecting a path different from the path selected for the first column of the previous row.

In another embodiment, the invention provides a communications system, comprising a source for messages, a plurality of destinations having defined destination addresses, a plurality of communications paths such that messages can be sent to the plurality of destinations from the source over the plurality of communications paths, wherein the system is arranged to select different ones of the plurality of paths for successive messages in a series of messages from the source having sequential addresses, wherein the path for a message is selected using part of the destination address of the message.

In a further embodiment, the invention provides a communications system, comprising a selection number assigned to each of a plurality of destinations, wherein each destination is accessible over a plurality of data paths, first means for sending sequential messages to addresses interleaved over the destinations, second means for combining the selection number with a part of the address more significant than the part used for interleaving; and third means for selecting one of said plurality of common data paths for each message on the basis of the combination.

In another embodiment, the invention provides a system of distributing communications between paths, comprising a source arranged to send successive messages to a plurality of destination addresses defined in rows, each row interleaved over a plurality of columns, wherein each of the plurality of destination addresses is accessible over a plurality of common data paths, wherein the source is arranged to select successive paths for messages to successive columns within a row of addresses; and wherein for the first column of each row of addresses, the source is arranged to select a path different from the path selected for the first column of the previous row.

BRIEF DESCRIPTION OF THE DRAWINGS

For purposes of illustrating the invention, the drawings show one or more forms in which the invention can be embodied. The invention is not, however, limited to the precise forms shown. In the drawings.

DETAILED DESCRIPTION

Figure 1:
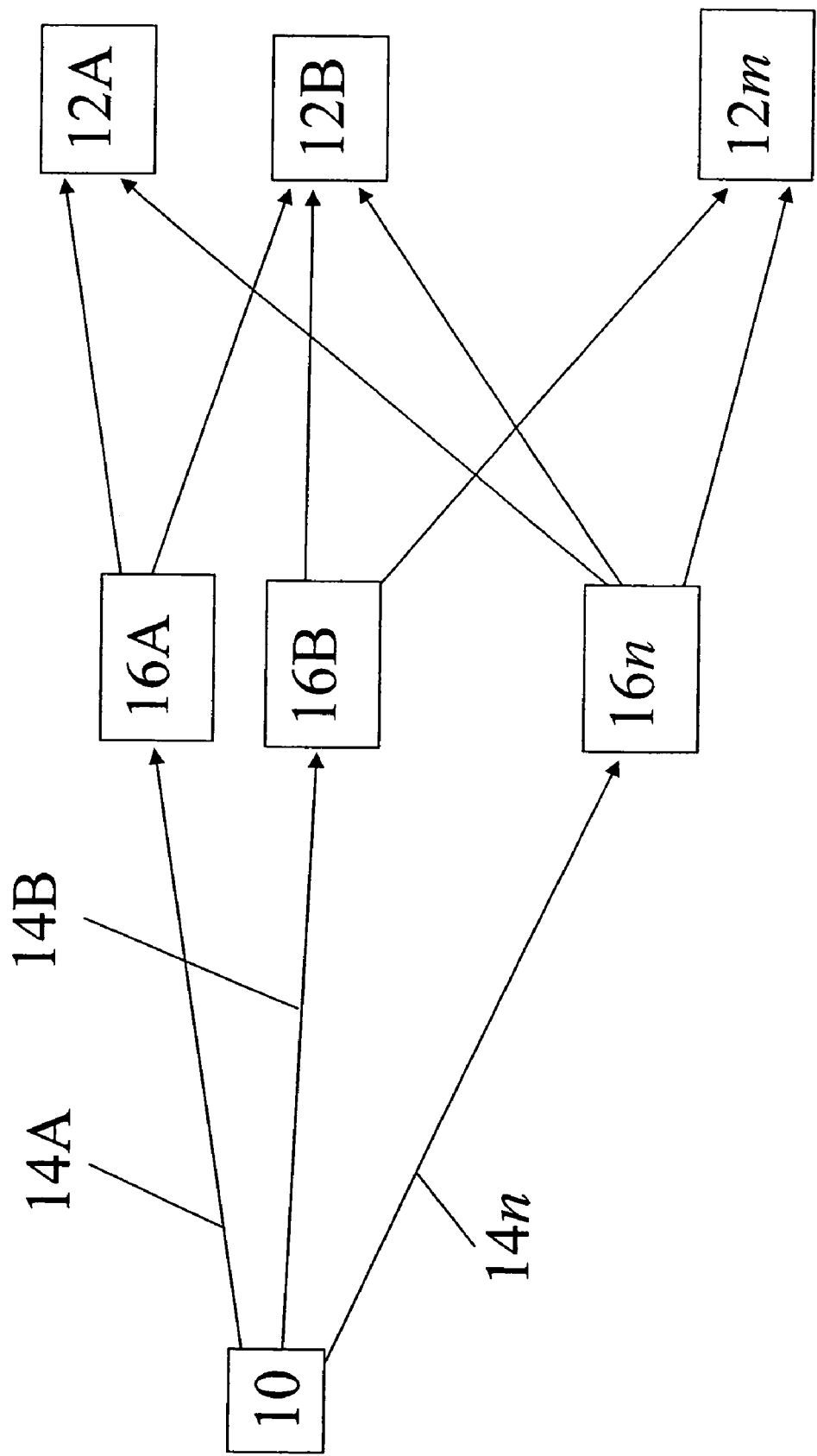
FIG. 1 is a block diagram of a system according to an embodiment of the invention.

Referring to the drawings, in one form of communication system incorporating an embodiment of the present invention a sending device 10 wishes to send communications to a plurality of destinations at recipient devices 12A, 12B, . . . 12m. A plurality of communication paths or links 14A, 14B, . . . 14n are available. Destination addresses can be interleaved across the recipient devices 12A, 12B, . . . 12m in such a manner that, when the sending device 10 sends a message to each of a set of sequential addresses, it sends a message to each of the recipient devices in turn. In order to distribute the traffic as evenly as possible over the available bandwidth, the sending device 10 is to distribute the messages over the paths 14A, 14B, . . . 14n.

As shown in FIG. 1, the communications paths do not lead directly from the sending device 10 to the recipient devices 12A, 12B, . . . 12m. Each of the outgoing paths 14A, 14B, . . . 14n instead leads to intermediate communications devices 16A, 16B, . . . 16n. Each of the intermediate devices 16A, 16B, . . . 16n is linked to some, but not necessarily all, of the recipient devices 12A, 12B, . . . 12m.

Each message sent is preferably in the form of a communications packet, with appropriate destination, origin, and other header information as well as the actual information to be delivered. Those skilled in the art will understand that the message need not be in a formal packet. A simpler format may be used, provided that there is sufficient routing information to ensure that the message reaches, and is correctly processed by, the intended recipient device. Alternatively, each message could be in the form of a short sequence of packets or other transmissible units. However, in the interests of conciseness, the term "packet" will be used in the following description of the preferred embodiments.

In one embodiment of the invention, each packet is assigned to a path on the basis of its destination address. For example, the address modulo n, where n is the number of paths 14A . . . 14n that have connections to the desired destination device 12A ... 12m, can be used to identify a selected path for a packet. The selected path may be identified by providing the sending device 10 with a destination map 20 that indicates to the sending device which destination device 12A ... 12m to choose for a given destination address. However, an interaction may then occur between the interleaving over the recipient devices and the interleaving over the paths. This is especially the case if the number m of recipient devices 12A ... 12m is a multiple of, or shares a common factor with, n. Such interactions may result in uneven use of the available communications paths.

In a further embodiment of the invention, the part of the address 22 referred to as the column number 24, is used as an index into the destination map 20 for the purpose of determining the destination device. The destination map 20 may be selected from a plurality of destination maps (referred to in FIG. 2 as the "table of destination maps" 21) using some portion of the upper address bits 34. However, the column number 24 is disregarded, and the higher digits of the address immediately above the column number, referred to as the row number 26, are used to identify a selected path for a packet. As above, the row number may be expressed modulo n to determine the path number. It is not usually necessary to use all of the higher digits of the address as the "row number" for the purpose of path selection. The very highest digits may often be omitted in order to simplify the arithmetic. In the present and subsequent embodiments, at least sufficient digits are used that the number of possible values of the row number used in selecting the path is greater than n.

The use of the row number 26, and not the column number 24, in selecting the path eliminates interactions between the two interleaving patterns. It is also extremely simple to implement. However, the effect is typically that during a series of messages with sequential addresses each path will be used for m consecutive packets or more than m consecutive packets when revisiting occurs. As a result, while the traffic may be evenly distributed in the long term, it is uneven in the short term, which may be undesirable for some purposes.

In a further embodiment of the invention, a selection number is assigned at the sending device 10 to each recipient device 12A ... 12m. Table I shows an example of the allocation of selection numbers for a system with eight recipient devices and three paths. The selection numbers may be incorporated into the destination map 20 maintained by the sending device 10. As shown in Table I, the selection numbers may be a set of x consecutive numbers $\{0, 1 \ldots x-1\}$ where $x \leq n$. The selection number may then be added modulo x to the row number of the address in an adder 28 to select a path. As may be seen from Table I, this results in an even distribution of traffic over the paths in the long term, and only slight unevenness in the short term. In the embodiment as shown in Table I, at the end of each row and the beginning of the next, two successive packets are transmitted on the same path. However, this averages out over three rows.

It will be appreciated that in most cases x will be set equal to n, so that all of the n paths are used. However, by configuring the adder 28 to generate sums for more than one value of x, and then selecting the sum for the value of x that corresponds to the number n of paths that are available to a specific address, the device can easily accommodate changes in the number of paths. This is advantageous if, for example, there are three paths available for some transmissions and only two paths for other transmissions. In a further embodiment of the invention, the sending device 10 then has a table of path maps 30. Each path map 30 specifies, for a specific destination 12, which of the paths 14A ... 14n are available to that destination. Each path map 30 preferably also has an entry specifying how many paths are available to that destination 12. Where there are either x or x' paths from the sending device 10 to each destination 12, the entry specifying the number of paths may be a one-bit indicator. A mod selector 31 then uses the number of paths indicator from the path map 30 to select the appropriate output from the modulo x adder 28, and uses that output to select one of the available paths from the path map 32. This embodiment may be implemented entirely in hardware, allowing fast, reliable operation, with the data content of the maps being software programmable. This embodiment is useful if the number of paths may change unpredictably, for example, because of a broken link that disables one of the three paths, but affects transmissions to only some destinations. In that case, it is only necessary to amend the path maps for the affected destinations so as to delete the disabled path and to update the number of paths indicator.

If the row number 26 omits the highest-order digits 34 of the address, so that the row number can roll over to zero in the course of a long series of transmissions, then an irregularity may occur at the roll over, which may be different from the irregularity that occurs at other row ends. In the embodiment shown in Table I, if only two bits are used for the row number, so that the row number rolls over from 3 to 0, then path 2 is skipped at the rollover. This typically causes a cumulative imbalance between paths of one packet every time the row number rolls over. It is therefore preferred to use sufficient digits in the row number 26 that rollovers are relatively infrequent. This consideration may apply to various of the embodiments of the invention that use the row number 26 in selecting the path.

The embodiment shown in Table I has the advantage that the choice of path used for a specific packet is determined entirely by the row 26 and column 24 of the destination address. Thus, packets sent by a particular sending device 10 to the same destination address 12 will all travel by the same path 14. This may help in the coherency design of the system, especially with respect to ordering.

TABLE I

| Recipient device (column) | A(0) | B(1) | C(2) | D(3) | E(4) | F(5) | G(6) | H(7) |
|---|---|---|---|---|---|---|---|---|
| Selection number | 0 | 1 | 2 | 0 | 1 | 2 | 0 | 1 |
| Path | | | | | | | | |
| Row number = 0 | 0 | 1 | 2 | 0 | 1 | 2 | 0 | 1 |
| Row number = 1 | 1 | 2 | 0 | 1 | 2 | 0 | 1 | 2 |
| Row number = 2 | 2 | 0 | 1 | 2 | 0 | 1 | 2 | 0 |
| Row number = 3 | 0 | 1 | 2 | 0 | 1 | 2 | 0 | 1 |

The sum of the row number and the selection number is not used directly to select the path, but is mapped to the path by the path map 30. Examples of such a mapping are shown in Table II. The actual path used for each sum may differ from those shown, and if the path map 30 is in a hardware table programmed by software then the mapping may easily be changed. For example, different permutations of the mapping may be used by different sending devices 10 or for different destination cells, to eliminate a specific interaction, to increase the statistical uniformity of the traffic, or in cases where the system is not fully connected. For example, if one path of a three-path system fails, then the interleaving may be switched to a two-path system by adopting modulo 2 summing and specifying the two functioning paths for sum=0 and sum=1 in Table II.

TABLE II

| Result of calculation mod 2 | Result of calculation mod 3 | Path used |
|---|---|---|
| 0 | 0 | 0 |
| 1 | 1 | 2 |
| N/A | 2 | 1 |

In the embodiments described above with reference to Table I, each logical column (0) to (7) corresponds to a physical recipient device A to H. In that case, the selection numbers may be simply related to the column numbers. For example, as shown in Table I the selection number is simply the column number modulo 3, although other patterns of selection numbers are of course possible. However, the number of physical destination devices may be less than the number of columns, so that each destination device receives more than one message in the course of a single pass through a row of addresses, a process known as "revisiting." In this case, more even short-term distribution of traffic is usually achieved if successive visits to the same destination device do not use the same path. For example, if the selection numbers shown in Table I were used with a system having only three destination devices, so that "devices" A, D, and G were the same physical device visited three times, three successive messages to that device would be sent on the same path.

In a further embodiment of the invention, the selection numbers for the packets of the first visit to each destination device in a row are calculated as described above, for example, based on the column number modulo n. However, in the second and subsequent visits, the calculated selection numbers are incremented mechanically. This may be done by recording the selection number used for each column, and adding 1 to that selection number (modulo n) on each subsequent visit to the same device. Alternatively, this may be done by adding a rotation number for the visit to the column number or selection number of each physical device 12. The rotation number may be determined by recording the selection number calculated for the first physical destination device, and comparing the selection number calculated for the first device with that recorded from the previous visit. If the calculated and recorded selection numbers are identical, the rotation number is incremented and the selection number for the first column is recalculated. The selection numbers for this visit to the remaining physical devices are then calculated using the new rotation number. A pattern of selection numbers such as that shown in Table III may then result:

TABLE III

| Recipient device (column) | A(0) | B(1) | C(2) | A(3) | B(4) | C(5) | A(6) | B(7) |
|---|---|---|---|---|---|---|---|---|
| Selection number | 0 | 1 | 2 | 1 | 2 | 0 | 2 | 0 |

The "revisiting" process has the advantage that it enables the number of logical columns to be a power of two, so that the column number is represented by distinct bits 24 in the binary address, even if the number of physical destination devices is a less convenient number.

In a further embodiment of the invention, the initial selection number is not a simple sum modulo the number of paths, but is calculated to generate a repeating sequence 0, 1, 2, 0, 1, 3, . . . . Then, if the initial selection number is applied to Table IV, a new number is generated in the repeating sequence 0, 1, 0, 0, 1, 1, . . . when summing modulo 2 and 0, 1, 2, 0, 1, 2, . . . when summing modulo 3. In that case, a balanced load over 3 paths, repeating every 3 packets, can be changed into a balanced load over 2 paths, repeating every 6 packets, merely by directing the sending device 10 to use x=2 for the modulo x adding. No changes are needed to the rest of the path allocation system.

TABLE IV

| Initial selection number | Number used: mod 2 | Number used: mod 3 |
|---|---|---|
| 0 | 0 | 0 |
| 1 | 1 | 1 |
| 2 | 0 | 2 |
| 3 | 1 | 2 |

Figure 2:
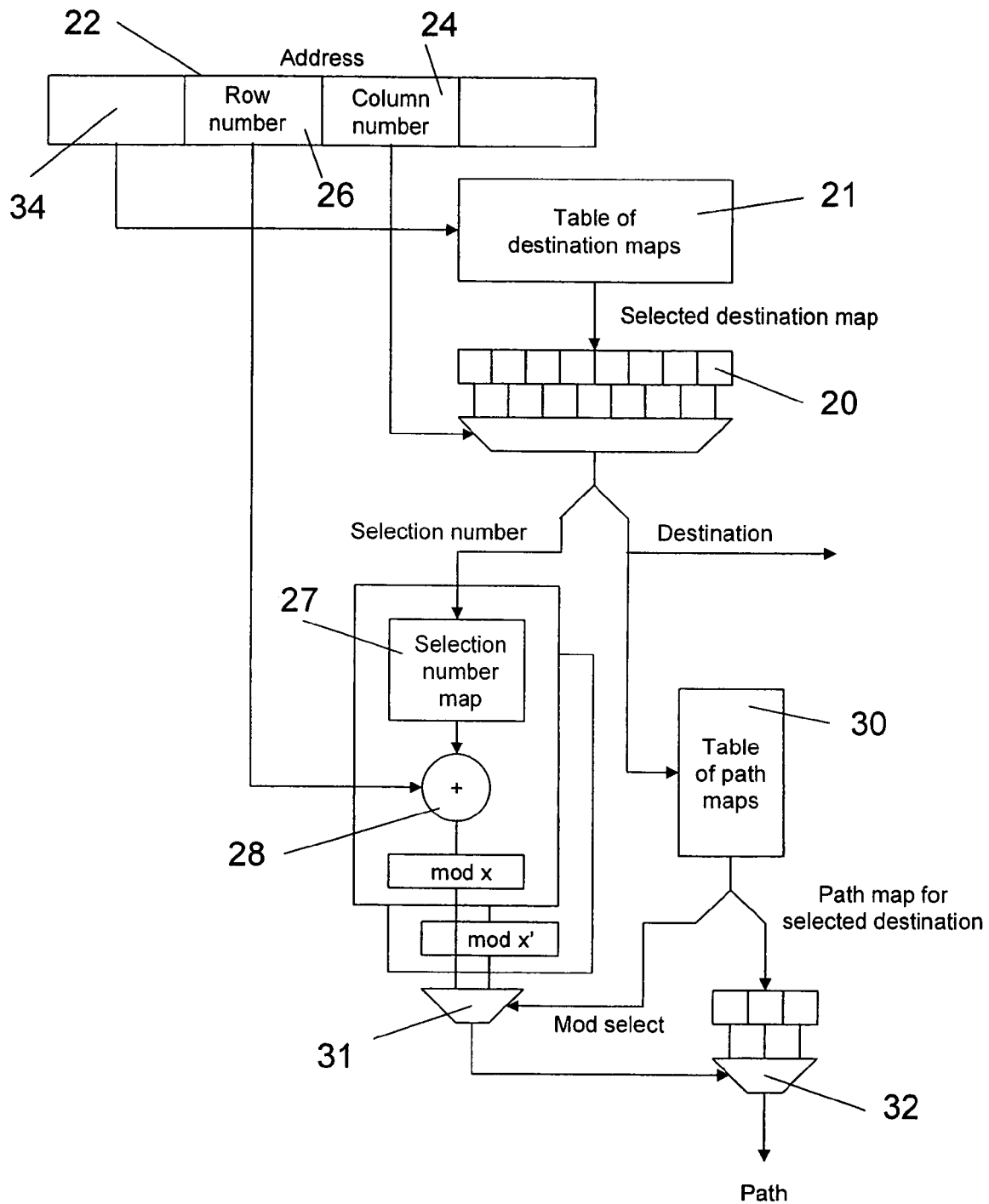
FIG. 2 is a functional block diagram of a path selecting device in a system according to FIG. 1.

As seen in FIG. 2, the path selecting device includes a selection number map 27 that shows where the mapping given in Table IV fits into the overall calculation. There is a separate selection number map for each different value of x used for the modulo x sum. Table IV shows the case where x can equal 2 or 3. A pattern of selection numbers such as that shown in Table V may result:

TABLE V

| Recipient device (column) | A(0) | B(1) | C(2) | A(3) | B(4) | C(5) | A(6) | B(7) |
|---|---|---|---|---|---|---|---|---|
| Selection number | 0 | 1 | 2 | 1 | 3 | 0 | 3 | 0 |

All of the above embodiments have been described in operation comprising sequential accesses to a range of addresses. It will be appreciated by those skilled in the art that a system capable of achieving uniform distribution of traffic for sequential accesses will, at least statistically, achieve uniform distribution for randomly-ordered accesses as well.

Although the invention has been described and illustrated with reference to exemplary embodiments thereof, it will be understood by those skilled in the art that various changes, omissions, and additions may be made thereto, without departing from the spirit and scope of the invention as recited in the attached claims. For example, the number n of paths may be only two, or may be greater than three.

Although only a single sending device 10 is shown in FIG. 1, a system may include two or more sending devices sharing the same paths 14. In that case, different sending devices may have different assignments of paths 14 for specific destination addresses. For example, where a destination map 20 is used, the preferred path or the path selection number for each recipient device may be different in different sending devices. In one embodiment the numbers are cyclically permuted for different sending devices 10. Different sending devices 10, like different destination devices 12, may be connected to different ones of the intermediate devices 16, and may therefore require different path maps. The resulting need to generate different tables of path maps for different sending devices 10 may require a substantial amount of work in generating the destination maps in a large system. However, those destination maps can be essentially permanent, as long as the configuration of the overall system does not change, so the effective overhead cost of generating the destination maps is low.

Although in the embodiment shown in FIG. 1 the sending device 10 is shown distinctly from the recipient devices 12A...12m, it will be understood that these devices may all be equivalent devices, each of which is sometimes the sending device and sometimes a recipient device. For example, the devices 10, 12 may be cells in a parallel computing architecture. The sending device 10 may itself be one of the devices over which the destination addresses are interleaved. It will be seen that this easily leads to the sort of resonance effect that certain embodiments of the present invention are directed to overcoming if, for example, the addresses are interleaved over 16 or 64 cells including the sending device 10, so that there are 15 or 63 destination cells 12 to be reached over 3 paths 14.

The path selection mechanism described here may be only one of several selection algorithms being applied simultaneously. For example, in some systems the full calculation described here may be used for some addresses, while for others a slightly simplified version may be used, and for still others a greatly simplified version may be used. Completely unrelated algorithms could also be applied to other address regions without departing from the invention.

Although reference has been made to using part of the destination address in the selecting a path for a message, in appropriate cases that part may be the entire address.

What is claimed is:

1. A method of distributing communications between paths, comprising:
   providing a plurality of destinations that are a plurality of devices;
   providing a plurality of communications paths such that all of the plurality of destinations can be accessed over all of the plurality of communications paths;
   defining destination addresses interleaved over the plurality of destinations;
   sending messages from a source to a plurality of the destination addresses; and
   selecting different ones of the plurality of paths for successive messages in a series of messages having sequential addresses;
   wherein the path for a message is selected from among the plurality of communications paths using part of the address of the message;
   wherein the destination addresses are defined in rows, each row is interleaved over a plurality of columns, each column is assigned to a destination device, and the number of columns is greater than or equal to the number of devices, comprising interleaving the columns over the destination devices, and selecting different ones of the plurality of paths for successive messages to the same destination device in a series of messages having sequential addresses within the same row of addresses.

2. A method according to claim 1, comprising sending messages from a plurality of sources, wherein the path for a message is selected in dependence on the source of the message.

3. A method according to claim 1, wherein different pluralities of destinations are accessible over different numbers of paths, comprising generating a sequence having more distinct values than the greatest number of paths, and mapping the distinct values to the available paths for each destination.

4. A method according to claim 3, comprising generating the distinct values with unequal frequencies, and mapping the distinct values to the available paths with equal frequency for each path.

5. A method of distributing communications between paths, comprising:
   providing a plurality of destinations;
   providing a plurality of communications paths such that all of the plurality of destinations can be accessed over all of the plurality of communications paths;
   defining destination addresses;
   sending messages from a source to a plurality of the destination addresses; and
   selecting different ones of the plurality of paths for successive messages in a series of messages having sequential addresses;
   wherein the path for a message is selected from among the plurality of communications paths using part of the address of the message;
   wherein different pluralities of destinations are accessible over different numbers of paths, comprising generating a sequence having more distinct values than the greatest number of paths, and mapping the distinct values to the available paths for each destination;
   comprising generating the distinct values with unequal frequencies, and mapping the distinct values to the available paths with equal frequency for each path;
   wherein a plurality of destinations is accessible over up to three paths, comprising generating first and second distinct values one-third of the time each, and third and fourth values one-sixth of the time each, and mapping the first distinct value to one of three paths, the second distinct value to another of the three paths, and the third and fourth distinct values to the third of the three paths, mapping the first and third distinct values to one of two paths and mapping the second and fourth distinct values to the other of the two paths, and mapping all four distinct values to a single path.

6. A method of distributing communications between paths, comprising:
   assigning a selection number to each of a plurality of destinations, wherein each destination is accessible over a plurality of common data paths;
   sending sequential messages to addresses interleaved over the destinations;
   combining the selection number with a part of the address between the part used for interleaving and a most significant bit end of the address; and
   selecting one of said plurality of common data paths for each message on the basis of the combination;
   wherein the step of combining comprises summing the selection number and the said part of the address.

7. A method according to claim 6, wherein the summing is adding modulo the number of available paths.

8. A method according to claim 6, wherein the step of selecting comprises mapping the result of the combining step to a path.

9. A method of distributing communications between paths, comprising:
defining destination addresses in rows, each row interleaved over a plurality of columns;
sending successive messages to a plurality of the destination addresses, wherein each of the plurality of destination addresses is accessible over a plurality of common data paths;
within a row of addresses, selecting successive paths for messages to successive columns; and
for the first column of each row of addresses, selecting a path different from the path selected for the first column-in of the previous row.

10. A method according to claim 9, wherein the path for each message is selected using the column number of the destination address for the message.

11. A method according to claim 9, wherein the path for each message is selected using the row number of the destination address for the message.

12. A method according to claim 9 wherein the plurality of destination columns are interleaved over a smaller plurality of destination devices, comprising:
calculating the path for each message using a rotation number in combination with the column number of the destination address for the message;
for the first device visited:
comparing the calculated path with the path used for the first device in the previous visit;
if the calculated path is the same as the path used in the previous visit, changing the rotation number and recalculating the path for the first device; and
for the remainder of the devices calculating the path using the most recent rotation number.

13. A communications system, comprising:
a source for messages;
a plurality of destinations having defined destination addresses;
a plurality of communications paths such that messages can be sent to the plurality of destinations from the source over any of the plurality of communications paths; and
a plurality of destinations that are a plurality of devices;
wherein the system is arranged to select different ones of the plurality of paths for successive messages in a series of messages from the source having sequential addresses;
wherein the path for a message is selected using part of the destination address of the message;
wherein the destination addresses are interleaved over the plurality of destinations; and
wherein the destination addresses are defined in rows, each row is interleaved over a plurality of columns, each column is assigned to a destination device, the number of columns is greater than or equal to the number of devices, and the columns are interleaved over the destination devices, and the system is arranged to select different ones of the plurality of paths for successive messages to the same destination device in a series of messages having sequential addresses within the same row of addresses.

14. A system according to claim 13, comprising plurality of sources for messages, wherein the path for a message is selected in dependence on the source of the message.

15. A system according to claim 14, wherein the sources for messages are devices that are also destinations for messages.

16. A system according to claim 1, wherein different pluralities of destinations are accessible over different numbers of paths, comprising a destination map associating selection numbers having more distinct values than the greatest number of paths with sequential addresses, and a path selector arranged to map the distinct values to the available paths for each destination.

17. A system according to claim 16, wherein the selection numbers are present in the destination map with unequal frequencies, and the path selector is arranged to map the distinct values to the available paths with equal frequency for each path.

18. A communications system, comprising:
a selection number assigned to each of a plurality of destinations, wherein each destination is accessible over a plurality of common data paths;
first means for sending sequential messages to addresses interleaved over the destinations;
second means for combining the selection number with a part of the address between the part used for interleaving and a most significant bit end of the address; and
third means for selecting one of said plurality of common data paths for each message on the basis of the combination;
wherein the second means is for summing the selection number and the said part of the address.

19. A system according to claim 18, wherein the summing comprises adding modulo the number of available paths.

20. A system according to claim 18, wherein the third means is for mapping the result of the combining step to a path.

21. A system of distributing communications between paths, comprising:
a source arranged to send successive messages to a plurality of destination addresses defined in rows, each row interleaved over a plurality of columns, wherein each of the plurality of destination addresses is accessible over a plurality of common data paths;
wherein the source is arranged to select successive paths for messages to successive columns within a row of addresses; and
wherein for the first column of each row of addresses, the source is arranged to select a path different from the path selected for the first column of the previous row.

22. A system according to claim 21, wherein the source is arranged to select the path for each message using the column number of the destination address for the message.

23. A system according to claim 21, wherein the source is arranged to select the path for each message using the row number of the destination address for the message.

* * * * *

UNITED STATES PATENT AND TRADEMARK OFFICE
CERTIFICATE OF CORRECTION

PATENT NO. : 7,406,091 B2
APPLICATION NO. : 10/756668
DATED : July 29, 2008
INVENTOR(S) : Michael A. Schroeder et al.

It is certified that error appears in the above-identified patent and that said Letters Patent is hereby corrected as shown below:

In column 9, lines 15-16, in Claim 9, delete "column-in" and insert -- column --, therefor.

In column 10, line 9, in Claim 16, delete "claim 1" and insert -- claim 13 --, therefor.

Signed and Sealed this

Fourteenth Day of October, 2008

JON W. DUDAS
*Director of the United States Patent and Trademark Office*